April 15, 1952 R. S. GRIMSHAW 2,592,684
ORNAMENTAL FIXTURE
Filed June 24, 1947
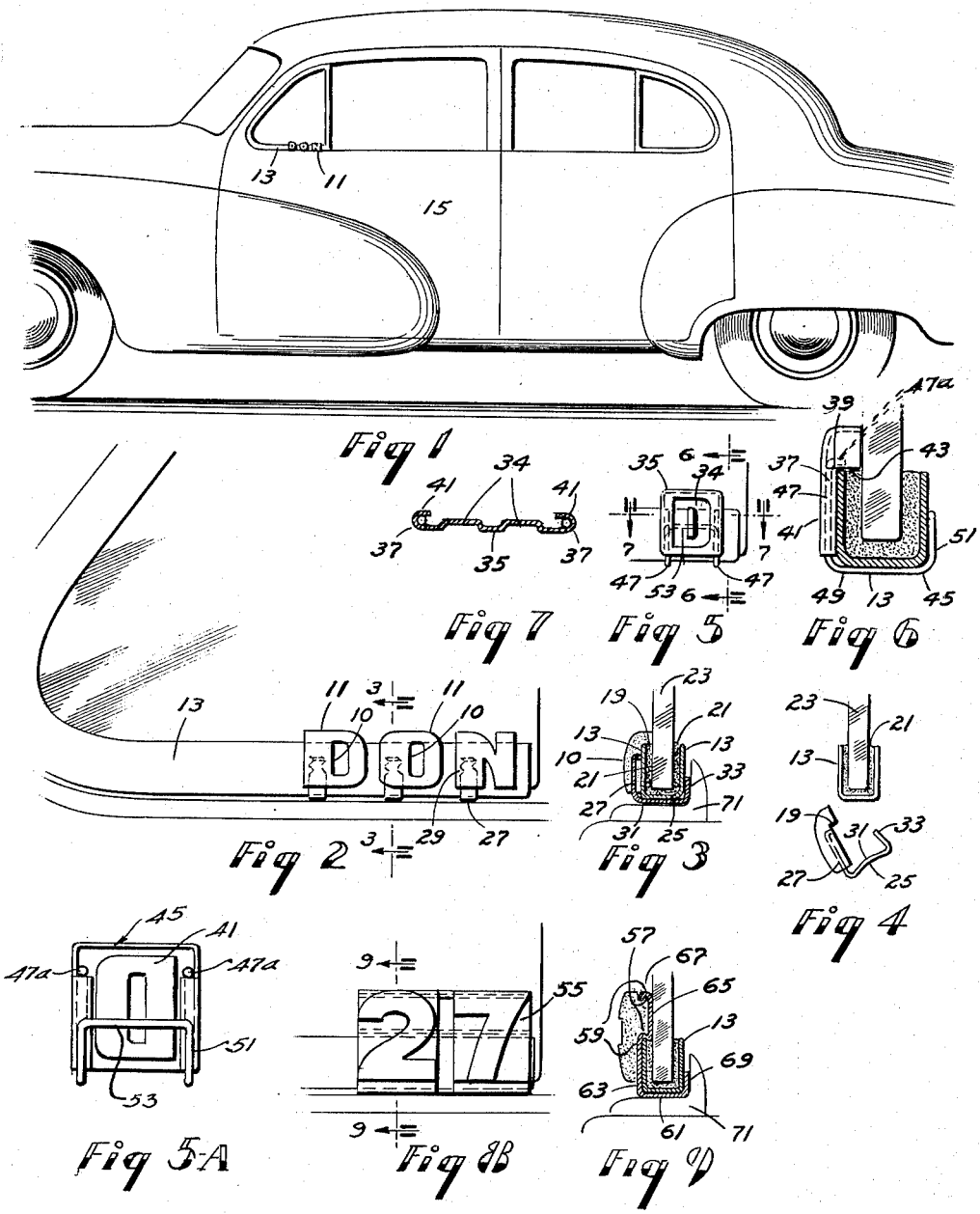
INVENTOR
ROBERT S GRIMSHAW
PER *Harness, Dickey & Pierce*
ATTYS.

Patented Apr. 15, 1952

2,592,684

UNITED STATES PATENT OFFICE 2,592,684

ORNAMENTAL FIXTURE

Robert S. Grimshaw, Detroit, Mich.

Application June 24, 1947, Serial No. 756,750

2 Claims. (Cl. 40—142)

This invention relates generally to ornamental fixtures, and, more particularly, to identification means such as initials, emblems, or figures which may readily be attached to a vehicle or the like.

It is an object of this invention to provide identification means such as emblems, initials, or figures which can be removably attached to a vehicle or the like so that said identification means can be removed therefrom without damaging the finish of said vehicle.

It is a further object of this invention to provide identification means such as emblems, initials, figures or the like which can be attached to a conventional automobile ventilator window so that said identification means can be easily seen to identify the automobile to the owner or any other person. These ventilating window frame locations are common to every make and type of automobile, and an important feature of this invention is the utilization of these universal locations.

It is a still further object of this invention to provide identification means which are ornamental in design, cheap to construct, and which can be easily and firmly mounted to a mounting member without fear of displacement therefrom.

These and other objects of this invention will become apparent from the following detailed description taken in conjunction with the accompanying drawing, in which:

Figure 1 is a side elevational view of an automobile showing the ornamental fixture of this invention mounted on a ventilator window thereof;

Fig. 2 is an enlarged side elevational view of the fixture illustrated in Fig. 1;

Fig. 3 is a cross-sectional view of the embodiment shown in Fig. 2, taken along the line 3—3 thereof;

Fig. 4 is a view showing the manner in which the fixture of Fig. 1 may be applied to a vehicle;

Fig. 5 is a side elevational view illustrating another embodiment of the invention;

Fig. 5A is an enlarged rear view of the fixture of Fig. 5, shown removed from its supporting window;

Fig. 6 is a cross-sectional view of the embodiment shown in Fig. 5, taken along the line 6—6 thereof;

Fig. 7 is a horizontal cross-sectional view of the embodiment shown in Fig. 5, taken along the line 7—7 thereof;

Fig. 8 is a side elevational view of a further embodiment of this invention; and Fig. 9 is a cross-sectional view of the embodiment shown in Fig. 8, taken along the line 9—9 thereof.

Referring to the drawing, it will be seen that ornamental fixtures, illustrated in the drawing as initials 11 forming a monogram or name, are attached to the frame 13 of the conventional ventilator window of an automobile 15. This invention, however, is not restricted to a use merely on automobiles, but contemplates the attachment of the ornamental fixtures to any suitable mounting member any place such fixtures might be desired. Likewise, this invention contemplates the use of any type of an ornamental fixture, such as emblems, figures, or initials, but in the drawing, and more specifically in Figs. 1-7, initials are shown as constituting the ornamental fixtures for the purpose of simplicity of description.

Referring now to Figs. 2, 3, and 4, the complete fixture is made up of a plurality (specifically three) structurally separate initials, the attaching means for all of which are alike. The body 10 of each initial 11 may be made of die-cast metal, plastic, or any other suitable material, and, if desired, the outline of the initial itself may be raised or sunken on the body 10 by casting or molding. The upper end of each body 10 is formed with a rearwardly extending flange 19 the lower surface of which is adapted to rest upon the upper edge of the ventilator window frame 13 and the adjacent window sealing strip 21. As shown, the back edge of the flange 19 abuts against the window pane 23. A generally U-shaped flat spring clip 25 is provided for securing the initials 11 to the ventilator window frame 13. The front vertical leg 27 of the spring clip 25 is serrated as at 29 and, preferably, the body portion 10 of the fixture is molded with the leg 27 in place therein, and as shown the turned inner end of the clip may serve as a locating element in the molding operation. These serrations 29 on the leg 27 aid in preventing the removal or pulling away of the initial from the spring clip. The horizontal leg 31 of the spring clip passes underneath the U-shaped ventilator frame 13 and the rear vertical leg 33 of the spring clip has its upper end bent inwardly somewhat. This allows the rear leg 33 of the spring clip to rigidly grasp the ventilator window frame 13 and mount the initial 11 firmly in place. The fixture 11 cannot move downwardly because of the flange 19 which abuts against the upper end of the U-shaped frame 13, and the leg 33 of the spring clip prevents any lateral movement once the spring clip and initial are snapped on the ventilator window frame. In order to attach or remove the clip and initial, it is merely necessary to expand, through use of a suitable forcing tool, the distance between the front and rear vertical clip legs and slide the same endwise over the window frame.

In the embodiment of the invention shown in Figs. 5, 5A, 6, and 7, an initial 34 is illustrated as being depressed in a sheet metal body 35. Each side of the body 35 is provided with flanges 37 bent backwardly normal to the plane in which the initial 34 lies. Each of the flanges 37 is horizontally cut as at 39 adjacent its upper end. The portions 41 of the flange below the cuts 39 are turned inwardly to define clip receiving recesses, whereas the portions of the flanges above the cuts 39 continue to extend rearwardly to form shoulders 43 which are adapted to rest on the upper edge of the U-shaped channel frame 13. A wire spring clip 45 is provided for securing the initial to the ventilator window frame 13 and is in cross section of a generally U shape. The spring clip 45, however, is formed with two vertical forward legs 47 which are received in the recesses defined by portions 41. The upper ends 47A of legs 47 are laterally turned and overlie the upper ends of portions 41. Thus, clip 45 may be snapped into the body 35 by springing legs 47 together, inserting the clip into the space between portions 41 and releasing the legs. The ends 47A prevent the clip from being pulled downwardly out of the body. If desired, these vertical legs 47 may be rigidly secured between portions 37—41, as by welding, soldering or any other suitable method. Alternatively, crimping of the portions 41 may be relied upon. A horizontal leg 49 extends rearwardly from each vertical leg 47 beneath the bottom of the ventilator window frame 13. Each horizontal leg 49 is then bent upwardly to form a pair of vertical legs 51 which are adapted to grasp the back of the window frame 13, and are similar in function to the vertical leg 33 of the previous embodiment. The vertical legs 51 are interconnected at their upper ends by a transverse leg 53 which joins the two together to form an integral wire clip. The upper end of each leg 51 is bent inwardly to rigidly grasp the opposite side of the U-shaped channel frame 13, as previously described.

In the embodiment shown in Figs. 8 and 9, the ornamental fixture is shown as comprising two separate figures 55 which are attached to the window frame 13 by a clip which is common thereto. The figures 55 may be either embossed or otherwise formed to define desired characters. Each figure 55 is formed with a lug 57 on the rear face thereof which is formed with grooves 59 at the top and bottom thereof. A generally U-shaped sheet metal clip 61 is provided for connecting the body portion to the ventilator window frame 13. The forward vertical leg 63 of the spring clip 61 has a transverse outwardly facing channel 65, the upper and lower ends of which are hooked or bent toward the center thereof to provide tongues 67 which are adapted to fit in the grooves 57 on the lug at the rear face of the body portion 53. The figures 55 can be mounted on the clip 61 by sliding the lug portions thereof endwise into the channel 65 of the clip 61 and are secured thereto by the tongues 67 received in the grooves. It will be noted that the lower end of the body portion 53 abuts against the lower portion of the vertical leg 63. It likewise will be noted that the shoulder formed on the lower end of the channel 65 rests upon the upper edge of the window frame 13 to hold the clip and body portion in the desired position when the opposite or back vertical legs 69 of the clip 61 are clipped against the back vertical leg of the channel frame 13 in a manner similar to that previously described for the above embodiments. The front and rear legs 63 and 69 can be made wide enough to receive one figure or several if so desired. In the embodiment in the drawing, both figures are mounted on the same clip.

It will likewise be noted that in all of the embodiments of this invention, when the ventilator window is swung shut against the inner sealing strip 71, the back vertical legs of the retaining clips abut against the inner edge thereof and are firmly locked in place, making it impossible to remove the spring clip from the window while it is closed and locked.

It will thus be seen that the ornamental fixtures of this invention may be secured to an automobile, house window or any other suitable mounting member without marring the surface thereof or in any way damaging the mounting member. For instance, if it is desired by one having an ornamental fixture mounted on his automobile to sell the same, the ornamental fixture can be easily removed from the automobile without damaging the same or without any necessity of refinishing the car for the new purchaser. It is a great advantage over the present day ornamental fixtures which are often bolted to the automobile or painted thereon and require a new purchaser to refinish the car or plug up the holes by which the ornament is mounted on the automobile.

What is claimed is:

1. An identification letter, numeral or emblem, to be removably mounted on an automobile body ventilating window frame, said frame having a symmetrical U-shaped cross section which defines a shoulder on either side and embraces the window glass, said identification member being molded, cast or otherwise a permanent part of one end of a clip portion, said clip portion being generally U-shaped so as to embrace and resiliently grip said first mentioned window frame, said identification member having an offset shape on the inward portion thereof adapted to be disposed on the one side of said window frame member which is adapted to interlockingly engage over said shoulder.

2. An identification letter, numeral or emblem to be removably mounted on an automobile body ventilating window frame, said frame having a symmetrical U-shaped cross section which defines a shoulder on either side and embraces the window glass, said identification member comprising of a letter, numeral or emblem being molded, cast or otherwise a permanent member of one end of a clip portion, said clip portion being generally U-shaped and having one upstanding leg thereof connected with said body portion, a second upstanding leg portion having its upper end bent inwardly toward said first leg and a substantially horizontal leg interconnecting said upstanding legs whereby to embrace and resiliently grip said frame portion, said identification member having an offset shape on the inward portion which is adapted to be disposed on the one side of said frame member so as to interlockingly engage over said shoulder.

ROBERT S. GRIMSHAW.

REFERENCES CITED

The following references are of record in the file of this patent:

UNITED STATES PATENTS

| Number | Name | Date |
|---|---|---|
| 1,754,908 | Schade | Apr. 15, 1930 |
| 1,757,440 | Sharp | May 6, 1930 |
| 2,040,012 | Mix | May 5, 1936 |
| 2,262,501 | Johnsen | Nov. 11, 1941 |